(12) United States Patent
Sotnikov et al.

(10) Patent No.: US 11,758,015 B2
(45) Date of Patent: *Sep. 12, 2023

(54) SYSTEMS AND METHODS FOR PREVENTING THE CACHING OF RARELY REQUESTED OBJECTS

(71) Applicant: Akamai Technologies, Inc., Cambridge, MA (US)

(72) Inventors: Dmitry Sotnikov, Rishon Lezion (IL); Brian Mancuso, Cambridge, MA (US); Shai Kedem, Ramat Gan (IL); Omri Guttman, Hod Ha Sharon (IL); Michael Hakimi, Holon (IL)

(73) Assignee: Akamai Technologies, Inc., Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/930,935

(22) Filed: Sep. 9, 2022

(65) Prior Publication Data

US 2023/0199085 A1    Jun. 22, 2023

Related U.S. Application Data

(63) Continuation of application No. 17/645,325, filed on Dec. 21, 2021, now Pat. No. 11,445,045.

(51) Int. Cl.
*H04L 67/5682* (2022.01)
*H04L 61/58* (2022.01)
*H04L 67/5681* (2022.01)

(52) U.S. Cl.
CPC .......... *H04L 67/5681* (2022.05); *H04L 61/58* (2022.05); *H04L 67/5682* (2022.05)

(58) Field of Classification Search
None
See application file for complete search history.

(56) References Cited

U.S. PATENT DOCUMENTS 7,240,100 B1 *   7/2007   Wein ................... H04L 67/1001
                                                                 709/214
7,552,284 B2 *   6/2009   Petev ...................... G06F 12/122
                                                                     718/1

(Continued)

OTHER PUBLICATIONS

U.S. Appl. No. 17/645,325, filed Dec. 21, 2021, (issued as U.S. Pat. No. 11,445,045).

(Continued)

*Primary Examiner* — Backhean Tiv

(57) ABSTRACT

Improved technology for managing the caching of objects that are rarely requested by clients. A cache system can be configured to assess a class of objects (such as objects associated with a particular domain) for cacheability, based on traffic observations. If the maximum possible cache offloading for the class of objects falls below a threshold level, which indicates a high proportion of non-cacheable or "single-hitter" content, then cache admission logic is configured to admit objects only after multiple clients requests during a time period (usually the object's time in cache, or eviction age). Otherwise, the cache admission logic may operate to admit objects to the cache after the first client request, assuming the object meets cacheability criteria. The technological improvements disclosed herein can be used to improve cache utilization, for example by preventing single-hitter objects from pushing out multi-hit objects (the objects that get hits after being added to cache).

21 Claims, 3 Drawing Sheets

(56) References Cited

U.S. PATENT DOCUMENTS

| | | | | |
|---|---|---|---|---|
| 7,584,294 | B2* | 9/2009 | Plamondon | H04L 67/02 |
| | | | | 709/233 |
| 7,590,803 | B2* | 9/2009 | Wintergerst | G06F 12/121 |
| | | | | 711/134 |
| 7,694,065 | B2* | 4/2010 | Petev | G06F 9/4493 |
| | | | | 718/1 |
| 7,912,978 | B2* | 3/2011 | Swildens | H04L 67/06 |
| | | | | 370/229 |
| 8,180,720 | B1* | 5/2012 | Kovacs | H04L 67/568 |
| | | | | 706/47 |
| 8,549,226 | B2* | 10/2013 | Ari | G06F 12/0888 |
| | | | | 711/117 |
| 9,336,275 | B2* | 5/2016 | Potapov | G06F 12/00 |
| 9,361,232 | B2* | 6/2016 | Umamageswaran | |
| | | | | G06F 16/24552 |
| 9,509,804 | B2* | 11/2016 | Stevens | H04L 67/02 |
| 10,229,161 | B2* | 3/2019 | Kakarla | G06F 16/24552 |
| 10,452,563 | B1* | 10/2019 | McCall | G06N 20/00 |
| 10,581,948 | B2* | 3/2020 | Goel | H04L 67/55 |
| 10,963,381 | B2* | 3/2021 | Flores | H04L 67/06 |
| 11,445,045 | B1* | 9/2022 | Sotnikov | H04L 67/5682 |
| 11,445,225 | B2* | 9/2022 | Sotnikov | H04N 21/2665 |
| 2004/0054860 | A1* | 3/2004 | Dixit | G06F 12/0888 |
| | | | | 711/160 |
| 2022/0132182 | A1* | 4/2022 | Sotnikov | H04N 21/23106 |
| 2022/0188028 | A1* | 6/2022 | Mesnier | G06F 3/067 |

OTHER PUBLICATIONS

Transmittal Letter titled Communication Under Mpep § 609.02, submitted with this SB/08, dated Sep. 9, 2022, 1 page.

* cited by examiner

SYSTEMS AND METHODS FOR PREVENTING THE CACHING OF RARELY REQUESTED OBJECTS

CROSS REFERENCE TO RELATED APPLICATIONS

This application is a continuation of U.S. Application Ser. No. 17/645,325, filed Dec. 21, 2021, issued as U.S. Pat. No. 11,445,045, the contents of which are hereby incorporated by reference.

BACKGROUND

Technical Field

This application generally relates to the caching of objects, such as in caching proxy servers on the Internet.

Brief Description of the Related Art

Content delivery networks (CDNs) typically use cache servers to improve the delivery of websites, web applications, and other online content such as streaming media. A CDN usually has many such cache servers distributed across the Internet, e.g., located in end user access networks, peering points, or otherwise. An end user client desiring content under a hostname being handled by the CDN is directed to a cache server, or cluster thereof, in the CDN. This may be accomplished using a DNS-based request routing mechanism, in which the CDN's domain name service returns an IP address of a selected cluster or server in response to a name lookup for the hostname. Such techniques are known in the art.

Due to the aforementioned request routing mechanism, the end-user client makes a content request for a desired object to a selected cache server in the CDN, for example using HTTP or other application layer protocol. The cache server maintains a local cache of content (also referred to, equivalently, as an 'object' cache). Typical object types that are stored in a cache include, without limitation, markup language documents, images, video segments, scripts, CSS files, JSON objects, and API data. Cached objects may also comprise records fetched from an origin database, such as product catalog, shipping records, inventory status, flight records, or any other kind of record. The cache server searches this cache for the requested object. If it locates the requested object and that cached object is not expired (TTL not expired) and otherwise valid to serve (cache hit), the end-user client request can be served out of cache. If not (cache miss), the cache server generally needs to fetch the object from an upstream server, which may be, for example, a parent server in the CDN (e.g., using a cache hierarchy model, as described in U.S. Pat. No. 7,603,439), or an origin server associated with the content provider that is associated with the hostname of the requested object. In this way, the content provider can make its website, web application, enterprise tool, or other online property available to end-users via the CDN in an improved fashion.

To fetch content from upstream, the cache server issues what is often referred to as a 'forward request'. After retrieving the content from the parent, or origin, or otherwise from an upstream server, the cache server can serve it to the end-user client and it can cache the object for a time period (e.g., as indicated by a time to live or TTL) to be locally available to satisfy future client requests. Serving from cache is desirable. It is undesirable to be fetching objects from the origin infrastructure in particular, because doing so increases response time for the end user, increases network traffic, and increases load (decreases offload) on the origin infrastructure.

After a forward request, the cache server faces a choice of whether or not to cache the object. Aggressively caching content can be wasteful. If an object is rarely requested by clients, then it may stay in cache for a long time and potentially expire without another client request arriving for it. That is inefficient use of limited cache resources. It is known in the art to mitigate this problem by admitting an object to the cache only if it has been requested multiple times within its TTL period. A Bloom filter can be used for this purpose: when an object is first requested, it is added to the Bloom filter, but not cached. Its entry in the bloom filter persists for the TTL. Whenever a client request arrives and if a forward request is issued, the object is checked in the Bloom filter, and if there is a hit, it means the object has been requested (and not available in cache) multiple times within the time period, and should be cached. Of course, the approach may be adjusted to require any number N of multiple requests before caching the object.

The weakness of the foregoing approach is that the system is missing out on caching on the first hit, so offload is reduced. And if the eviction age is not properly tuned, the Bloom filter may result in the object never being cached. For example if the eviction age is too short, it may repeatedly age out of the Bloom filter before being requested again, and then the next request also does not cause a cache admission because it is treated as a first request. Hence the benefit of caching is missed. The term "eviction age" in this context means a time period that a given object remains in the cache from the last access until it is aged out.

This patent document discloses improved systems and methods for admitting objects to caches that improve upon prior techniques and mitigate the drawback explained above. More generally, this patent document discloses improved systems and methods for improving cache performance when traffic includes rarely-requested objects (sometimes referred to as "single-hitter" objects).

More information about CDN technologies, including examples of request routing mechanisms using DNS and otherwise, as well as proxy server technologies, can be found in the following documents, the teachings of which are hereby incorporated by reference in their entireties: U.S. Pat. Nos. 6,108,703; 7,293,093; 7,096,263; 7,096,266; 7,484,002; 7,523,181; 7,574,499; 7,240,100; 7,603,439; 7,725,602; 7,716,367; 7,996,531; 7,925,713; 7,058,706; 7,251,688; 7,274,658; 7,912,978; 8,195,831.

The teachings presented herein improve the functioning of a computer system itself, improving the caching function in an individual server as well as that of a larger distributed system comprised of many such servers. Those skilled in the art will understand these and other improvements from the teachings hereof.

BRIEF SUMMARY

This section describes some pertinent aspects of this invention. Those aspects are illustrative, not exhaustive, and they are not a definition of the invention. The claims of any issued patent define the scope of protection.

Improved technology for managing the caching of objects that are rarely requested by clients. A cache system can be configured to assess a class of objects (such as objects associated with a particular domain) for cacheability, based on traffic observations. If the maximum possible cache offloading for the class of objects falls below a threshold level, which indicates a high proportion of non-cacheable or "single-hitter" content, then cache admission logic is configured to admit objects only after multiple clients requests during a time period (usually the object's time in cache, or eviction age). Otherwise, the cache admission logic may operate to admit objects to the cache after the first client request, assuming the object meets cacheability criteria. The technological improvements disclosed herein can be used to improve cache utilization, for example by preventing single-hitter objects from pushing out multi-hit objects (the objects that get hits after being added to cache).

The claims are incorporated by reference into this section, in their entirety.

BRIEF DESCRIPTION OF THE DRAWINGS

The invention will be more fully understood from the following detailed description taken in conjunction with the accompanying drawings, in which.

Numerical labels are provided in some FIGURES solely to assist in identifying elements being described in the text; no significance should be attributed to the numbering unless explicitly stated otherwise.

DETAILED DESCRIPTION

The following description sets forth embodiments of the invention to provide an overall understanding of the principles of the structure, function, manufacture, and use of the methods and apparatus disclosed herein. The systems, methods and apparatus described in this application and illustrated in the accompanying drawings are non-limiting examples; the claims alone define the scope of protection that is sought. The features described or illustrated in connection with one exemplary embodiment may be combined with the features of other embodiments. Such modifications and variations are intended to be included within the scope of the present invention. All patents, patent application publications, other publications, and references cited anywhere in this document are expressly incorporated herein by reference in their entirety, and for all purposes. The term "e.g." used throughout is used as an abbreviation for the non-limiting phrase "for example."

The teachings hereof may be realized in a variety of systems, methods, apparatus, and non-transitory computer-readable media. It should also be noted that the allocation of functions to particular machines is not limiting, as the functions recited herein may be combined or split amongst different hosts in a variety of ways.

Any reference to advantages or benefits refer to potential advantages and benefits that may be obtained through practice of the teachings hereof. It is not necessary to obtain such advantages and benefits in order to practice the teachings hereof.

Basic familiarity with well-known web page, streaming, and networking technologies and terms, such as HTML, URL, XML, AJAX, CSS, GraphQL, HTTP versions 1.1 and 2, HTTP over QUIC, MQTT, TCP/IP, and UDP, is assumed.

All references to HTTP should be interpreted to include an embodiment using encryption (HTTP/S), such as when TLS secured connections are established. While context may indicate the hardware or the software exclusively, should such distinction be appropriate, the teachings hereof can be implemented in any combination of hardware and software. Hardware may be actual or virtualized.

Figure 1:
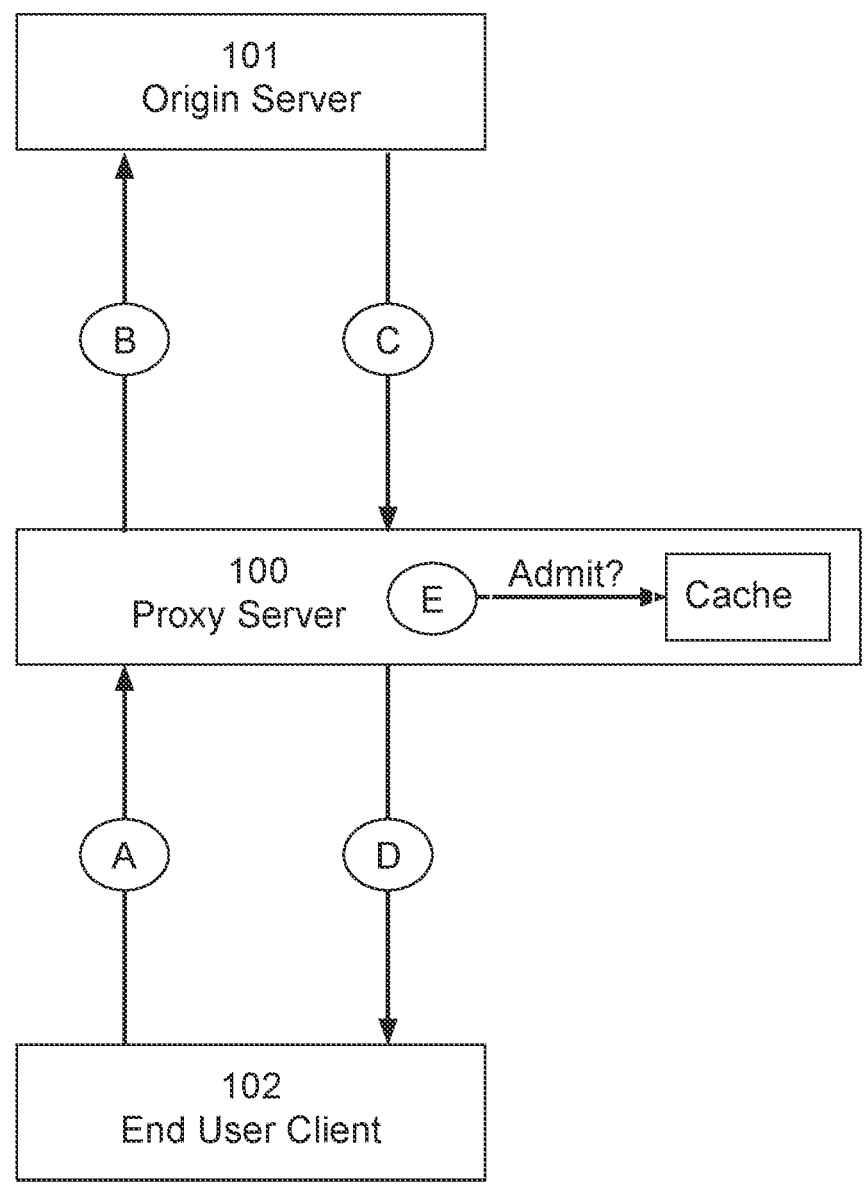
FIG. 1 is an illustration of a system in accord with one embodiment of the invention.

FIG. 1 illustrates a system in accord with one embodiment of the invention. Proxy server 100 is positioned as a network intermediary between origin server 101 and end user client 102. As is well known in the art, a cache parent server may be positioned between the proxy 100 and origin 101 in some cases, but for simplicity of explanation it is omitted here. Likewise, in some cases the proxy server 100 has one or more peer servers located nearby or locally, as well known in the art; this too has been omitted for simplicity of explanation and to focus the description on the inventive teachings hereof.

In operation, the end user client 102 makes an object request (e.g. HTTP GET) to the proxy server 100 (label A). If the proxy server 101 experiences a cache miss, then it issues a forward request to the origin 101 for the object (label B). When the content is returned, the proxy server 100 sends it to the end user client 102 in response to the client's initial request (label D). Assuming that the object is marked as cacheable (e.g., in HTTP header fields), the proxy server 100 also must decide whether to admit the object to its local cache (label E).

A variety of factors may go into the cache admission decision, such as the available cache space. However, the focus here is whether to apply a requirement that the object be requested frequently enough to warrant cache admission. Frequently enough means that the object is requested by clients and results in a forward request to origin multiple times during a limited time period before being admitted to the cache. Of course, the number of times can be configurable, as can be the time period for that object. But typically the number of times is two, and the time period is the time to live (TTL) value for that object.

In this document, operation of the cache admission logic without the "multiple request" requirement is sometimes referred to as a "first mode". The first mode thus involves caching a cacheable object upon first client request that results in a forward request (assuming any other cache admission criteria are met). Invoking the "multiple request" cache admission requirement is sometimes referred to as a "second mode" of the cache admission logic, and involves caching a cacheable object only after multiple client requests that result in a forward request (assuming any other cache admission criteria are met).

Figure 2:
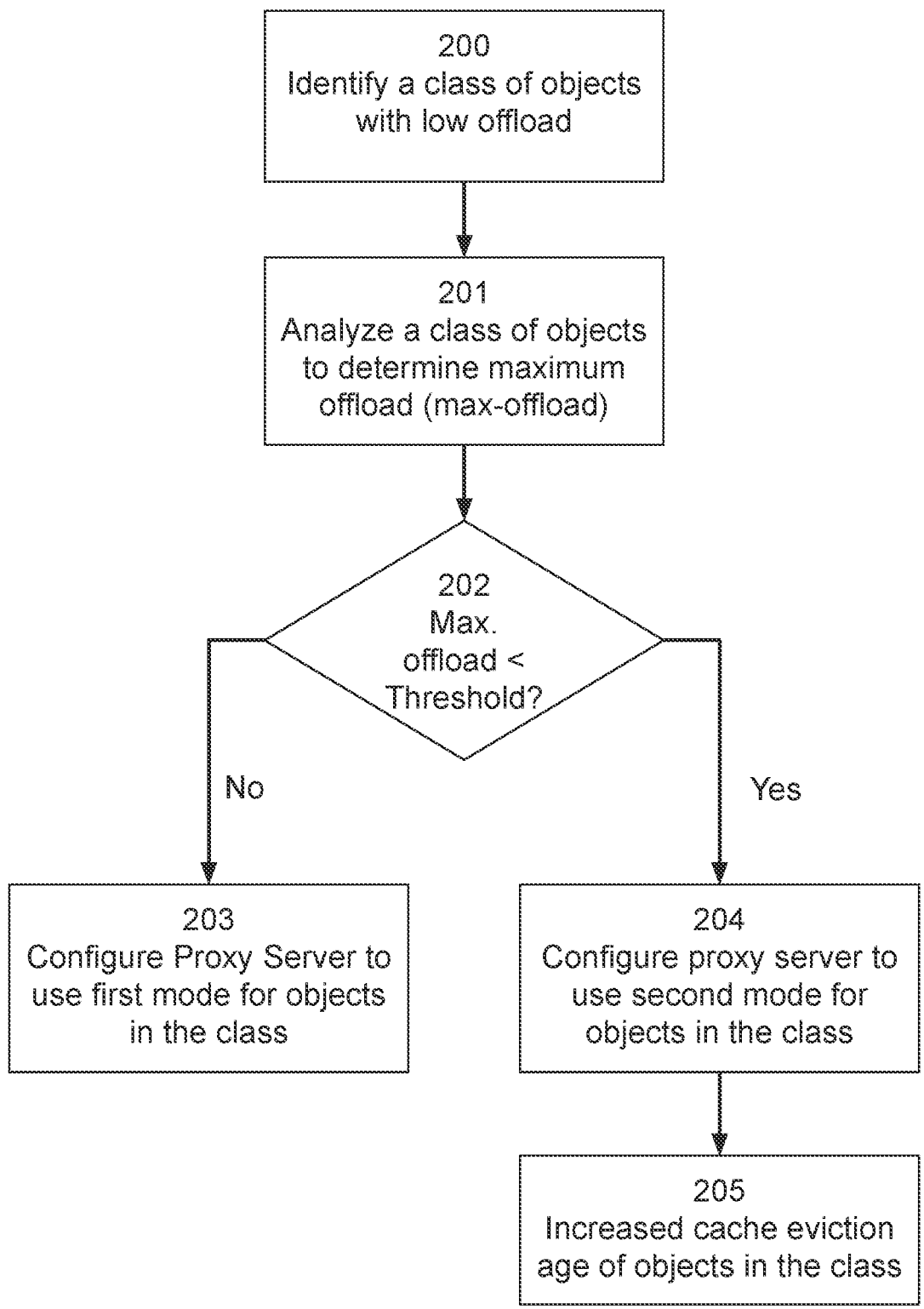
FIG. 2 is an illustration of a method in accord with one embodiment of the invention; and, FIG. 3 is a block diagram illustrating hardware in a computer system that may be used to implement the teachings hereof.

FIG. 2 illustrates a method operable in the system of FIG. 1, in accord with one embodiment of the invention.

At 200, a particular class of objects for which the CDN is providing a low offload is identified. This can be accomplished by examining the logs of a CDN as known in the art, e.g., monitoring client requests for objects and forward requests and finding the difference between the two, which reveals the offload. The offload can be measured as an average over a 24 hour period, or a low point or high point during a time period, or in any other ways. Furthermore metric could be number of objects or more preferably in data size (bytes). A suitable threshold for offload being "low" can be 5% or less, or in some implementations 10% or less. In some implementations, certain minimum sizes of object classes can be applied to filter out small classes. In addition, if prefetching is enabled for a class of objects, such classes might be excluded or treated differently since the prefetching is deemed desirable for performance even though it reduces offload.

At 201, the traffic (the client request stream) for the particular class of objects is analyzed to determine the maximum offload potential from caching. Techniques for performing this step are taught in co-pending, commonly assigned U.S. patent application Ser. Nos. 17/081,329 and 17/081,691, both filed Oct. 27, 2020 and titled "MEASURING AND IMPROVING ORIGIN OFFLOAD AND RESOURCE UTILIZATION IN CACHING SYSTEMS", which are published as U.S. Patent Publication Nos. 2022-0132182 and 2022-0132183. The contents of the foregoing two applications are hereby incorporated by reference in their entireties and for all purposes.

Using the teachings of the above-mentioned patent applications, a maximum offload is calculated for the class of objects. Typical examples for a class of objects are the objects associated with a given domain name, or with a subdomain, or with a given URL path. Another example is objects associated with a given content provider, which in other words is a given tenant in a multi-tenant platform known as a content delivery network (CDN). This metric can be recalculated every so often, e.g., every 1 hour, every 24 hours, etc.

Step 201 may be performed in an offline process on systems distinct from the proxy server 100.

At 202, the threshold is applied to the maximum offload determination. For example, the threshold might be 15%, or in some cases higher, such as 20%. The analysis from 200 might reveal that the maximum offload of the class of objects is less than 15%. The threshold value can be adjusted over time to achieve better performance.

If the maximum offload is more than the threshold, then at 203 the proxy server 100 is configured to apply the first mode of cache admission logic. Configuration may be accomplished via any suitable techniques, such as a metadata configuration as described in, e.g., U.S. Pat. Nos. 7,240,100 and 9,509,804, the contents of which are hereby incorporated by reference in their entireties.

If the maximum offload is less than the threshold, then at 204 the proxy server 100 is configured to apply the second mode of cache admission logic, thereby requiring multiple client requests for an object before caching that object. One way to implement the "multiple request" requirement, known in the art, is to add the object to a Bloom filter upon the first client request. Objects expire from the Bloom filter after a period of time (preferably related to the eviction age time, e.g., twice the average eviction age of the cache). As client requests arrive for objects, they are checked against the Bloom filter, so if it is found, then the object meets the "multiple request" requirement. (As those skilled in the art will understand, if it were desired to require that the object be requested 3 times, the object could be moved to a "higher tier" Bloom filter, which would be checked upon subsequent requests. Generalizing, to require N requests before caching, one can use N bloom filters and when the request for a given object is received, first it is searched in bloom filter i (i=1), and if the object is found and i<N the logic increases i (i=i+1) and looking for it again in the next Bloom filter, if not found, add it to the i Bloom filter, and if the final Bloom filter is reached, that is, i equals N (i==N) you are allowed to cache the object.) More detail about how the Bloom filter can be designed for and used in this invention is provided in a later section. Preferably, and as described there, the Bloom filter is actually implemented as a system leveraging multiple Bloom filters.

Due to the use of the second mode of cache admission, the "single-hitter" objects will not be cached, which frees cache space. As a result, the same cache space will be able to cache objects in the class for longer time periods (i.e., increased cache eviction age), resulting in more potential hits, increasing offload and cache utilization metrics. This is indicated at 205 in FIG. 2.

In this way, misconfigured or sub-optimally configured object traffic that is not actually cacheable (single hitter traffic) can be automatically detected and removed from the cache, via the second mode operation. This is accomplished while not over-broadly applying the second mode to object traffic that does not need it.

Note that in implementations, the system state of whether a given class of objects is the first or second mode may affect the thresholds and criteria used in steps 200/201/202. In other words, the traffic for classes of objects that are already required to meet the second mode may need to exhibit suitably consistent maximum offload in order to be switched to the first mode. For example, it might be required that the maximum offload calculated at 202 rise to 30% before revoking the second mode. So the maximum offload can be recalculated periodically to check whether the second mode is still appropriate. Note that the maximum offload is calculated in accord with U.S. patent application Ser. Nos. 17/081,329 and 17/081,691 (as mentioned above) and it is distinct from the actual offload from origin being achieved at a given time period.

Bloom Filter Details (Second Mode)

The main purpose of the Bloom filter is to recognize single hitters—the objects that are accessed exactly once—with no repetition, so that the proxy server 100 can make smarter decisions related to their caching.

The Bloom is an algorithm that calculates two or more hash functions on the cacheable item store key. The hash functions are many-to-one type, meaning the same hash value can represent more than one store key. All the hash values are mapped over to a single large bit vector. When a bit is set, it means one or more store keys are mapped to this hash value. Since the hash functions are many-to-one as explained above, a single bit represents more than one hash function activated on different store keys.

On a single store-key, each hash function maps to a different bit in the bit vector, so a set of these bits represents a store-key.

The Bloom filter algorithm can answer the question if a certain store-key does not exist in the bit vector by checking all the bits of the bit set mentioned above, and if one or more of them are reset then it for sure does not exist.

If all the bits of all the hash functions for the store-key are set, then there is high probability that this store key might already exist in the bit set, but the bloom filter cannot guarantee 100% on this and this certainty level is a function of the number of hash functions and the length of the bit vector.

To summarize, the Bloom filter recognizes single hitter objects, and allows to distinguish them from objects that have reputable access patterns. But it's cost is to force a second hit that could otherwise be resolved from the cache, and it means that for customers that don't have a lot of single hitters it will pay this price without achieving any benefit.

On the other hand, the maximum offloading calculation related data and analysis allows for identification of object classes with a high ratio of single hitters. By using that data one can configure "avoid caching" for their traffic, but if there is a mixed pattern that includes single hitters and multi-hitters we will hurt the offloading even for the multi-hitters.

As illustrated above, by combining both approaches we can identify the object classes that have a high proportion of single hitters, and make the decision to apply a second mode (e.g., the Bloom filters) on them specifically. In such a way we will gain all the benefits of the Bloom filter in a safe way and still minimize the negative impact on the rest of the object classes.

As mentioned, the Bloom filter is preferably implemented as a system of multiple Bloom filters. For example, assume there are two Bloom filters, CURRENT and PREVIOUS. When the proxy server 100 goes forward to origin to fetch an object, it checks both Bloom filters to see if the object is present. If the object is present in either CURRENT and PREVIOUS, it is considered to be present in the Bloom filter as a whole for purposes of the second mode. The proxy server 100 then records the object in the CURRENT Bloom filter (regardless of whether it was found or not). When certain conditions are met, the Bloom filters are rotated, which means that the PREVIOUS Bloom filter is discarded, the CURRENT Bloom filter becomes the PREVIOUS Bloom filter, and a new, empty CURRENT Bloom filter is created. One condition that can trigger the Bloom filter rotation is that the CURRENT Bloom filter reaches a certain point of saturation (when a certain percentage of its bits have been set). A second condition that can trigger the Bloom filter rotation is that a certain amount of time has elapsed since the last rotation. This time period can be related to the average eviction age (e.g., it could be the average eviction age for the cache). Alternatively (or in addition), the Bloom filter sizes can be tuned in accord with how many objects can be cached before eviction. That is now explained in the next paragraphs.

The Bloom filters CURRENT and PREVIOUS can be configured in a particular way. As known in the art, a Bloom filter filter can be configured by setting the following parameters (with exemplary values provided):

n—the number of different elements that can be placed in the Bloom filter p—the probability of false positives, e.g., 0.01 (1 percent)

k—the number of hash functions, e.g., 7

In one embodiment, the parameter p=0.01 (1 percent), k=7, and the element size of the Bloom filter n is set to the object count limit for the proxy server 100 on which the Bloom filter will be used.

Algorithm Timing

In embodiments, maximum offload analysis (step 201) runs periodically. When the period is the same as the overall FIG. 2 algorithm period, there is no need for aggregation.

But it may be desired to support a mode where the maximum offload calculation period is shorter (e.g., 1 hour) and the overall algorithm still needs to be executed daily. In this situation, it is useful to maintain a "candidate" list in which a class of traffic that is below the maximum offload threshold is first marked as a candidate, which means that the traffic can be monitored for some time, rather than applying the second mode right away. By monitoring over time, the maximum offload potential can be more accurately calculated, and transient changes in traffic patterns will not cause erroneous decisions. The candidate can then be moved to the second mode if the maximum offload stays below the threshold (step 201).

To accommodate this alternative embodiment, the FIG. 2 algorithm period is configured in a system parameter. It is a multiple of the step 201 time period.

The step 201 report data contains the fingerprints vectors (origin, or parent plus origin), a list of unique fingerprint values that eventually derives the calculation of the maximal offload ratio. (For more information see aforementioned U.S. patent application Ser. Nos. 17/081,329 and 17/081,691, both filed Oct. 27, 2020 and titled "MEASURING AND IMPROVING ORIGIN OFFLOAD AND RESOURCE UTILIZATION IN CACHING SYSTEMS", which are published as U.S. Patent Publication Nos. 2022-0132182 and 2022-0132183.)

The fingerprint vectors are reset at the configured interval (e.g., 1 hour). But the FIG. 2 algorithm needs to look at an entire day's aggregation to decide if an object class needs to enter the second mode—that is, it requires all the unique fingerprints values collected over a day. This requires special handling to aggregate correctly.

The aggregation can be done as follows.

After each step 201 interval (default 1 hour), for each class in the report (default maximum, e.g., 500) that is not a candidate or in a list of classes using the "second mode", we will accumulate in the FIG. 2 data structures "pre-candidate" class data. The size of this list will be limited by configuration. Class reports when this limit is exceeded will be ignored.

The following data set is gathered per step 201 interval, that is total it will have 24 data sets (1 day==24 hourly reports, calculated from configuration by comparing step 201 vs. FIG. 2 intervals):

Number of cacheable requests
(cacheable_user_requests_total_count), type uint64_t.
Maximal offload ratio based on the hourly parent+origin requests fingerprints vector (type float)

In addition several counters are aggregated daily:
Number of requests served–(served_user_requests_total_count), type uint64_t
Capacity of requests served–(served_user_requests_total_capacity), type uint64_t.
Number of served from cache requests, type uint64_t. (used for cache efficiency calculation)
Capacity of served from cache requests, type uint64_t. (used for cache efficiency calculation)
Number of objects–(number_of_stored_objects), type uint64_t. This is aggregated using max() of all emulator reports.
Total time of emulator intervals, type uint64_t.

After the last hourly interval of the day, we calculate the weighted offload ratio using the formula below. (This is done to conserve memory by eliminating the need to save the data supporting the maximum offload potential estimation every hour for all object classes of interest, the pre-candidates. For more information on the supporting data, in particular footprint data, please refer to aforementioned U.S. patent application Ser. Nos. 17/081,329 and 17/081,691.)

sum
(hourly_num_of_cachable_requests*hourly_offload_ratio)/
sum(hourly_num_of_cachable_requests)

and also calculate cache hits efficiency for daily:
sum("Number of served from cache requests")/"Number of requests served"

and also calculate cache bytes efficiency for daily:
sum("Capacity of served from cache requests")/"Capacity of requests served"

After the last hourly report data, when we have the the following on all pre-candidate classes of objects:
Daily calculated weighted maximal offload ratio.
Daily calculated cache efficiency ratio.
Daily total number of requests served.

Daily total bytes for requests served.

Daily total number of objects served (calculated from maximum of hourly number of objects (number_of_stored_objects).

Daily count of hourly step 201 intervals, e.g. 14H out of 24H.

And we can check these against the thresholds to decide if the class can enter the candidates list for second mode operation. For example:

config:offload-avoid-caching.max-offload-high-threshold-pct config:offload-avoid-caching.cache-efficiency-ratio-high-threshold-pct config:offload-avoid-caching.noop-min-number-of-requests config:offload-avoid-caching.noop-min-number-of-objects config:offload-avoid-caching.noop-min-objects-size config:offload-avoid-caching.max-offload-calculation-minimum-cycle-interval—we check that "total offload intervals" is greater or equal.

After each step 201 report interval (default 1 hour), for each class in the report (currently default maximum is 500) that is already a candidate or in avoid-caching (second mode) list, we need to aggregate the hourly data a bit differently:

When the class first enters the candidate list, the system can create a fingerprints array (which should hold unique elements). This data item is an array of 1000 (default) uint32_t counters. This array is kept while the class is a candidate or in the list of classes using the second mode.

Each hourly fingerprints data set (of origin and parent) is aggregated into the above vector, using merge, sort and truncate operations, so that at the end of the daily interval we have all unique items fingerprints from the entire day. In addition we aggregate as before the following daily counters based on the hourly data:

Daily total number of requests served.

Daily total bytes for requests served.

Daily total number of objects served (calculated from maximum of hourly number of objects (number_of_stored_objects).

Daily count of hourly step 201 intervals, e.g. 14H out of 24H.

At the end of the daily interval, after the last hourly step 201 report, we can calculate the maximal offload ratio, cache efficiency and check the relevant thresholds to see if the class should remain in candidate-list, moved to the second mode list or removed from lists.

Because the aggregated fingerprints vector consumes valuable memory, it is preferable to limit the numbers of classes in the candidates list (although they could be unlimited). This number is configurable, e.g., 200.

To select the best classes to enter candidates list from the step 201 offload report pre-candidates list, one can sort the report based on its storage footprint (total number of objects and total size of objects).

Computer Based Implementation

The teachings hereof may be implemented using conventional computer systems, but modified by the teachings hereof, with the components and/or functional characteristics described above realized in special-purpose hardware, general-purpose hardware configured by software stored therein for special purposes, or a combination thereof, as modified by the teachings hereof.

Software may include one or several discrete programs. Any given function may comprise part of any given module, process, execution thread, or other such programming construct. Generalizing, each function described above may be implemented as computer code, namely, as a set of computer instructions, executable in one or more microprocessors to provide a special purpose machine. The code may be executed using an apparatus—such as a microprocessor in a computer, digital data processing device, or other computing apparatus—as modified by the teachings hereof. In one embodiment, such software may be implemented in a programming language that runs in conjunction with a proxy on a standard Intel hardware platform running an operating system such as Linux. The functionality may be built into the proxy code, or it may be executed as an adjunct to that code.

While in some cases above a particular order of operations performed by certain embodiments is set forth, it should be understood that such order is exemplary and that they may be performed in a different order, combined, or the like. Moreover, some of the functions may be combined or shared in given instructions, program sequences, code portions, and the like. References in the specification to a given embodiment indicate that the embodiment described may include a particular feature, structure, or characteristic, but every embodiment may not necessarily include the particular feature, structure, or characteristic.

Figure 3:
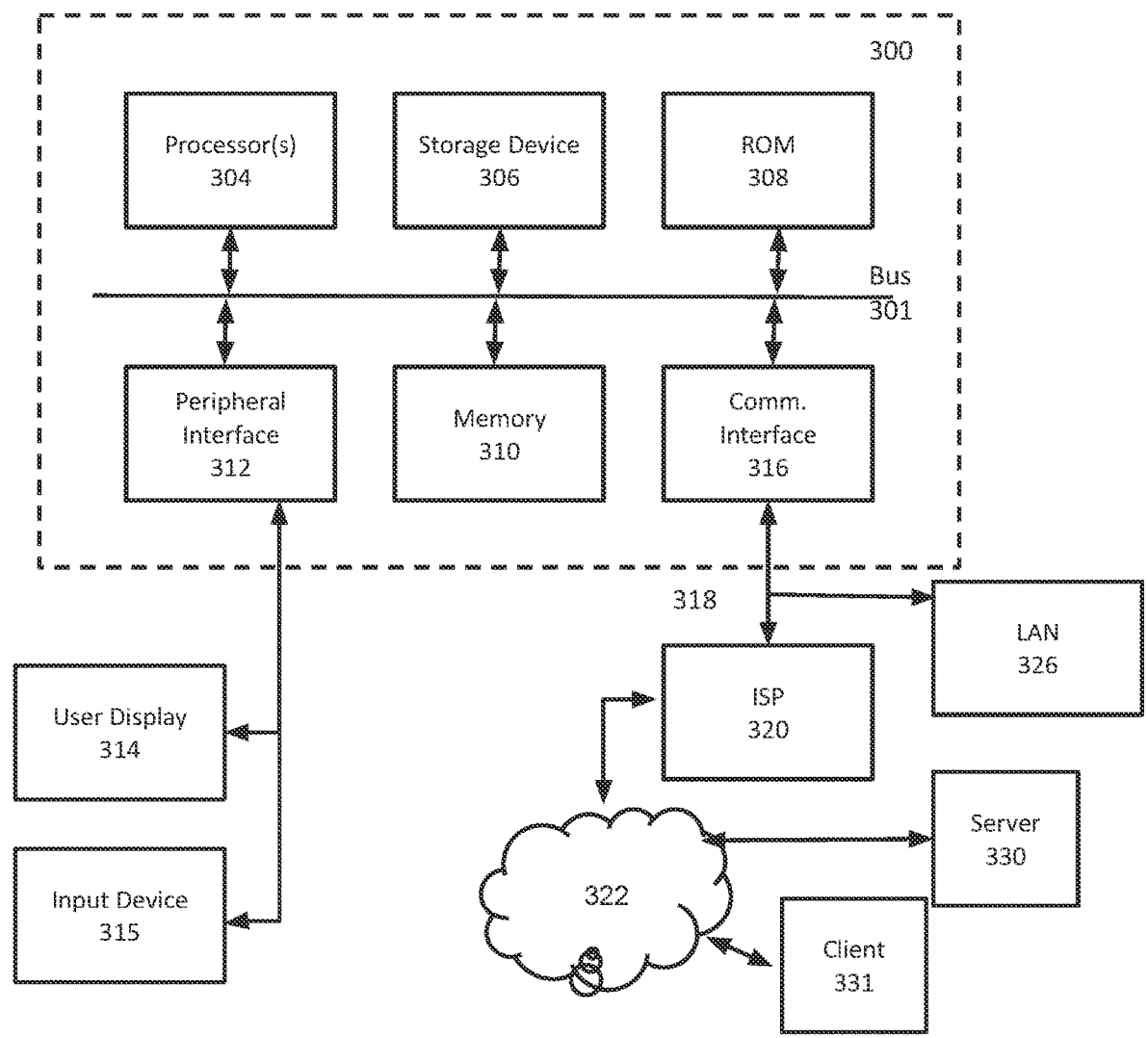

FIG. 3 is a block diagram that illustrates hardware in a computer system 300 upon which such software may run in order to implement embodiments of the invention. The computer system 300 may be embodied in a client device, server, personal computer, workstation, tablet computer, mobile or wireless device such as a smartphone, network device, router, hub, gateway, or other device. Representative machines on which the subject matter herein is provided may be a computer running a Linux or Linux-variant operating system and one or more applications to carry out the described functionality.

Computer system 300 includes a microprocessor 304 coupled to bus 301. In some systems, multiple processor and/or processor cores may be employed. Computer system 300 further includes a main memory 310, such as a random access memory (RAM) or other storage device, coupled to the bus 301 for storing information and instructions to be executed by processor 304. A read only memory (ROM) 308 is coupled to the bus 301 for storing information and instructions for processor 304. A non-volatile storage device 306, such as a magnetic disk, solid state memory (e.g., flash memory), or optical disk, is provided and coupled to bus 301 for storing information and instructions. Other application-specific integrated circuits (ASICs), field programmable gate arrays (FPGAs) or circuitry may be included in the computer system 300 to perform functions described herein.

A peripheral interface 312 may be provided to communicatively couple computer system 300 to a user display 314 that displays the output of software executing on the computer system, and an input device 315 (e.g., a keyboard, mouse, trackpad, touchscreen) that communicates user input and instructions to the computer system 300. However, in many embodiments, a computer system 300 may not have a user interface beyond a network port, e.g., in the case of a server in a rack. The peripheral interface 312 may include interface circuitry, control and/or level-shifting logic for local buses such as RS-485, Universal Serial Bus (USB), IEEE 1394, or other communication links.

Computer system 300 is coupled to a communication interface 316 that provides a link (e.g., at a physical layer, data link layer,) between the system bus 301 and an external communication link. The communication interface 316 provides a network link 318. The communication interface 316 may represent an Ethernet or other network interface card (NIC), a wireless interface, modem, an optical interface, or other kind of input/output interface.

Network link 318 provides data communication through one or more networks to other devices. Such devices include other computer systems that are part of a local area network (LAN) 326. Furthermore, the network link 318 provides a link, via an internet service provider (ISP) 320, to the Internet 322. In turn, the Internet 322 may provide a link to other computing systems such as a remote server 330 and/or a remote client 331. Network link 318 and such networks may transmit data using packet-switched, circuit-switched, or other data-transmission approaches.

In operation, the computer system 300 may implement the functionality described herein as a result of the processor executing code. Such code may be read from or stored on a non-transitory computer-readable medium, such as memory 310, ROM 308, or storage device 306. Other forms of non-transitory computer-readable media include disks, tapes, magnetic media, SSD, CD-ROMs, optical media, RAM, PROM, EPROM, and EEPROM, flash memory. Any other non-transitory computer-readable medium may be employed. Executing code may also be read from network link 318 (e.g., following storage in an interface buffer, local memory, or other circuitry).

It should be understood that the foregoing has presented certain embodiments of the invention but they should not be construed as limiting. For example, certain language, syntax, and instructions have been presented above for illustrative purposes, and they should not be construed as limiting. It is contemplated that those skilled in the art will recognize other possible implementations in view of this disclosure and in accordance with its scope and spirit. The appended claims define the subject matter for which protection is sought.

It is noted that any trademarks appearing herein are the property of their respective owners and used for identification and descriptive purposes only, and not to imply endorsement or affiliation in any way.

The invention claimed is:

1. A method of managing admission to a cache in a server, comprising:
   defining a class of objects which are candidates for admission to the cache;
   computing a maximum offload potential for the class of objects, based at least in part on observations of client requests for objects within the class of objects; and,
   based at least in part on the maximum offload potential, and with respect to the class of objects, increasing a required number of client requests for a given object within a limited time period to admit that given object to the cache.

2. The method of claim 1, wherein the class of objects is defined by association with a domain name.

3. The method of claim 1, wherein the class of objects is defined by association with a URL path.

4. The method of claim 1, wherein the class of objects is defined by association with a tenant, the server being part of a distributed set of servers forming a multi-tenant platform.

5. The method of claim 1, wherein the limited time period is related to a cache eviction age.

6. The method of claim 1, wherein the limited time period is related to a time to live value.

7. The method of claim 1, wherein the limited time period is related to a capacity of a Bloom filter.

8. A system of managing admission to a cache in a server, comprising:
   a set of one or more computers operable to:
      define a class of objects which are candidates for admission to the cache,
      compute a maximum offload potential for the class of objects, based at least in part on observations of client requests for objects within the class of objects, and,
      based at least in part on the maximum offload potential, and with respect to the class of objects, increase a required number of client requests for a given object within a limited time period to admit that given object to the cache; and,
   a server operable to:
      receive a configuration reflecting the increase specified by the first set of one or more computers, and
      adjust a cache admission logic for the cache based on the configurational,
   wherein each of the set of one or more computers and the server has circuitry forming at least one processor and memory holding computer program instructions for execution on the at least one processor to operate as specified above.

9. The system of claim 8, wherein the class of objects is defined by association with a domain name.

10. The system of claim 8, wherein the class of objects is defined by association with a URL path.

11. The system of claim 8, wherein the class of objects is defined by association with a tenant, the server being one of a distributed set of servers forming a multitenant platform.

12. The system of claim 8, wherein the limited time period is related to a cache eviction age.

13. The system of claim 8, wherein the limited time period is related to a time to live value.

14. The system of claim 8, wherein the limited time period is related to a capacity of a Bloom filter.

15. A non-transitory computer readable medium holding program instructions for execution on at least one processor, the program instructions comprising instructions to:
   define a class of objects which are candidates for admission to a cache;
   compute a maximum offload potential for the class of objects, based at least in part on observations of client requests for objects within the class of objects; and,
   based at least in part on the maximum offload potential, and with respect to the class of objects, increase a required number of client requests for a given object within a limited time period to admit that given object to the cache.

16. The non-transitory computer readable medium of claim 15, wherein the class of objects is defined by association with a domain name.

17. The non-transitory computer readable medium of claim 15, wherein the class of objects is defined by association with a URL path.

18. The non-transitory computer readable medium of claim 15, wherein the class of objects is defined by association with a tenant of a multi-tenant platform providing the cache.

19. The non-transitory computer readable medium of claim 15, wherein the limited time period is related to a cache eviction age.

20. The non-transitory computer readable medium of claim 15, wherein the limited time period is related to a time to live value.

21. The non-transitory computer readable medium of claim 15, wherein the limited time period is related to a capacity of a Bloom filter.

\* \* \* \* \*